W. FLAHERTY.
CHECK-ROWER.

No. 188,615. Patented March 20, 1877.

Witnesses:
Rich'd K. Evans
Geo. N. Evans

Inventor:
Wm. Flaherty
by A. H. Evans & Co
Atty's.

UNITED STATES PATENT OFFICE.

WILLIAM FLAHERTY, OF RAVANNA, MISSOURI.

IMPROVEMENT IN CHECK-ROWERS.

Specification forming part of Letters Patent No. 188,615, dated March 20, 1877; application filed February 12, 1877.

*To all whom it may concern:*

Be it known that I, WILLIAM FLAHERTY, of Ravanna, Mercer county, Missouri, have invented a new and useful Improvement in Check-Rowers, of which the following is a clear, full, and exact description, reference being had to the accompanying drawings, making a part of this specification, in which—

Figure 1:
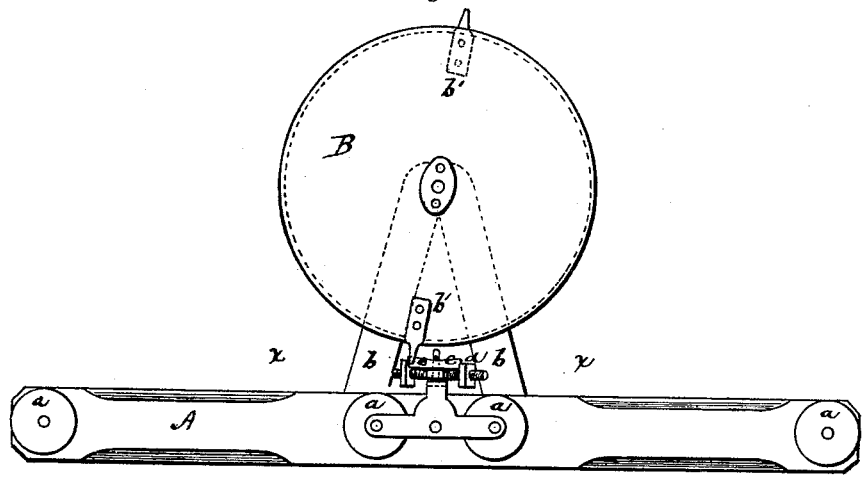
Figure 2:
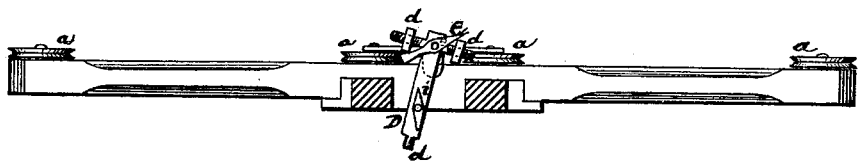
Figure 3:
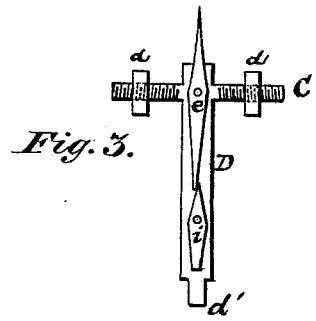

Figure 1 shows a top view of my invention. Fig. 2 is a rear view of section through lines $x\ x$ of Fig. 1. Fig. 3 is a detail of the operating lever.

The nature of my invention consists in the construction and arrangement of certain devices supported on a wheel-frame, for the purpose of check-rowing land and planting grain, the novel features of which will be hereinafter fully explained.

To enable others skilled in the art to make and use my invention, I will proceed to describe the exact manner in which I have carried it out.

In the drawings, A represents a cross-bar, which rests upon any properly-constructed wheeled frame; and on the top of this bar are securely pivoted the sheaves $a\ a\ a\ a$, around which passes the usual flexible chain or cord, by which means the check-rower is operated in the distribution or dropping of the grain.

The large horizontal disk B is pivoted in front of the cross-bar A to the arms $b\ b$ securely fastened to the bar and uniting under the center of the disk B, which is grooved on its periphery to receive the operating chain or cord. On the opposite edges of the circumference of the disk B I secure the tappets $b'\ b'$—one on the upper side of the disk, and one on the lower side.

Centrally between the planes of these tappets I pivot the vertical bar D to the cross-bar A, and, by means of the same bolt or pivot, I attach to the vertical bar D the arm $e$, as shown in Fig. 3. The lower end of this arm is made heavier than the upper, in order that the arm may at all times tend to a perpendicular position. Below this arm, and on the same face of the vertical bar D, I attach, by pivot, a second arm, $i$, also having its lower end the heavier, that its tendency may be a perpendicular position. The upper portion of this lower or second arm is sufficiently long to come slightly in contact with the arm $e$ as they both swing on their pivots in the same horizontal line. The object of the lower arm is, by coming in contact with the lower end of the upper arm, to steady the latter and prevent too much play.

Through the head of the vertical bar D is rigidly secured the bolt C, provided with the screw-nuts $d\ d$ for adjusting the lateral swinging of the arm $e$, and, together with the arm $e$, form a lever for vibrating the vertical bar D, to the lower end $d'$ of which is attached the slide of the hoppers for dropping the grain.

It will be evident from the above description that, as the nuts $d$ are advanced toward the pivot on which the arm $e$ moves, the arm will have less lateral play, and can pass less out of a vertical line; and when the upper portion comes in contact with one nut, and the lower portion in contact at the same time with the other nut, as shown in Fig. 2, the arm forms a lever by which the lower end of the bar D can be moved laterally, and thus move the slide of the dropping-hopper, to which it may be attached.

The operation of my invention is as follows: When the disk B is revolved by the chain or cord one of the tappets $b'$ is brought in contact with the upper part of the arm $e$, which carries it over, as shown in Fig. 1, until the arm rests against the nuts $d\ d$, when the arm forms a lever by which the tappet, in its passage, forces the lower end of the bar D in the opposite direction, thus moving the dropping-slide. Then, in a half-revolution of the disk B, the tappet on the lower plane of the disk comes in contact with the lower end of the arm $e$, reversing its position, as shown in Fig. 2, and causing the lower end of the bar to reverse, and with it reverse the movement of the dropping-slide. Thus, at every revolution of the disk there are two movements of the slide, and the distance between the hills is automatically adjusted regardless of the speed at which the check-rower travels.

Having thus described my invention, what

I claim as new, and desire to secure by Letters Patent, is—

The bar A, provided with the sheaves $a\ a\ a$, and disk B, provided with the tappets $b'\ b'$, in combination with the vertical bar D, provided with the pivoted arms $e$ and $i$, and the bolt C, provided with the nuts $d\ d$, all constructed to operate substantially as and for the purpose set forth.

WILLIAM FLAHERTY.

Witnesses:
 WM. M. CASTEEL,
 M. F. ROBINSON.